(12) United States Patent
Whaley

(10) Patent No.: US 6,501,202 B1
(45) Date of Patent: Dec. 31, 2002

(54) PAWL BRAKE ASSEMBLY FOR AN ELECTRIC MOTOR

(75) Inventor: Kenneth N. Whaley, Franklin, WI (US)

(73) Assignee: Fasco Industries, Inc., Chesterfield, MO (US)

( * ) Notice: Subject to any disclaimer, the term of this patent is extended or adjusted under 35 U.S.C. 154(b) by 0 days.

(21) Appl. No.: 09/937,987

(22) PCT Filed: Apr. 4, 2000

(86) PCT No.: PCT/US00/08869

§ 371 (c)(1),
(2), (4) Date: Oct. 3, 2001

(87) PCT Pub. No.: WO00/60722

PCT Pub. Date: Oct. 12, 2000

Related U.S. Application Data

(60) Provisional application No. 60/127,790, filed on Apr. 5, 1999.

(51) Int. Cl.⁷ .......................... H02K 7/106; H02K 7/10
(52) U.S. Cl. ........................................ 310/77; 310/93
(58) Field of Search .............................. 310/77, 93, 94; 188/161, 162; 192/12 D

(56) References Cited

U.S. PATENT DOCUMENTS

| | | | |
|---|---|---|---|
| 2,539,836 A | * 1/1951 | Hoffman | 310/77 |
| 3,219,858 A | * 11/1965 | Ellis et al. | 310/77 |
| 3,344,292 A | * 9/1967 | Hurst | 310/77 |
| 3,379,907 A | * 4/1968 | Hollinger | 310/77 |
| 3,478,238 A | * 11/1969 | Herman et al. | 310/77 |
| 4,237,439 A | 12/1980 | Nemoto | 335/230 |
| 4,240,055 A | * 12/1980 | Shimizu et al. | 335/234 |
| 4,282,503 A | 8/1981 | Shimizu et al. | 335/276 |
| 4,346,972 A | 8/1982 | Takahashi | 354/195 |
| 4,677,892 A | 7/1987 | Kramer et al. | 84/405 |
| 5,341,357 A | 8/1994 | Mukawa et al. | 369/75.2 |
| 5,444,317 A | * 8/1995 | Anderson et al. | 310/77 |
| 5,538,098 A | * 7/1996 | Sparhawk | 180/270 |

FOREIGN PATENT DOCUMENTS

| | | | | |
|---|---|---|---|---|
| FR | 1115651 | * | 1/1956 | 310/77 |
| GB | 676663 | * | 7/1952 | 310/77 |
| GB | 752328 | * | 7/1956 | 310/77 |

* cited by examiner

Primary Examiner—Karl Tamai
(74) Attorney, Agent, or Firm—Andrus, Sceales, Starke & Sawall, LLP

(57) ABSTRACT

The present invention is organized about the concept of providing an improved pawl brake assembly for use in electromechanical devices such as all electric motors or solenoids. For example, the improved pawl brake assembly may be used for braking the rotor assembly upon de-energization of the motor. The pawl brake assembly comprises a pawl arm and a brake portion. The pawl brake assembly employs electromagnetic principles to reduce the noise and metal fatigue caused by the undesired excess vibrational motion of a pawl arm wen a motor is energized. The novel use of a magnet disposed upon the pawl arm of a pawl brake assembly provides a single, elegant, and inexpensive solution to the identified noise and metal fatigue problems.

10 Claims, 8 Drawing Sheets

PAWL BRAKE ASSEMBLY FOR AN ELECTRIC MOTOR

CROSS-REFERENCE TO RELATED APPLICATION

The present invention is based on and claims priority to U.S. Provisional Patent Application Serial No. 60/127,790 filed on Apr. 5, 1999 and is a national stage application of PCT International Application No. PCT/US00/08869 filed Apr. 4, 2000 published in English on Oct. 03, 2000 as Publication No. WO 00/60722.

FIELD OF THE INVENTION

This invention relates in general to electric motors and solenoids, and in particular to an improved pawl brake assembly for any electric motor or solenoid.

BACKGROUND OF THE INVENTION

Many electric motors manufactured today use a pawl brake assembly to stop the movement of the rotor assembly when the motor is de-energized. Typically, in prior art brake designs when a motor is de-energized, the magnetic field generated in the stator core diminishes causing a spring in cooperative contact with the pawl brake assembly to pull the pawl brake into frictional engagement with the rotor assembly.

A disadvantage with prior art pawl brake assembly designs is that when the motor is energized, the portion of the pawl arm proximate to the motor lamination stack has excess vibrational movement. This excess movement causes the pawl arm to rattle and bump against the motor lamination stack, resulting in undesirable noise levels. Thus, there is a need in the art for a solution to the noise and metal fatigue caused by the excessive movement of the pawl arm of a pawl brake assembly.

SUMMARY OF THE INVENTION

The present invention is organized about the concept of providing an improved pawl brake assembly for use in electromechanical devices such as all electric motors or solenoids. For example, the improved pawl brake assembly may be used for braking the rotor assembly upon de-energization of the motor. The pawl brake assembly employs electromagnetic principles to reduce the noise and metal fatigue caused by the undesired excess motion of a pawl arm when a motor is energized.

In an exemplary embodiment according to the invention, the pawl brake assembly comprises a pawl arm and a brake portion in pivotal engagement with one another. The pawl arm may be composed of any metal alloy subject to the influence of a magnetic field, and the brake portion may be composed of any material such as plastic. The pawl arm may comprise a first end, a second end, and an extending trigger portion radially disposed between the first end and the second end of the pawl arm. The movement of the first end of the pawl arm is governed by pivotal contact with a fastener used to secure a bearing retainer to the stator assembly of an electric motor. The radially extending trigger portion of the pawl arm is in pivotal contact with the brake portion of the pawl brake assembly, e.g. via a pivotal groove.

To reduce noise and metal fatigue caused by excess vibration of the pawl brake assembly, a permanent magnet, e.g. a magnetic strip, is disposed on the second end of the pawl arm. When the motor is energized, sufficient magnetic attraction is established between the stator assembly and the magnetic strip to force and hold the second end of the pawl brake arm against the motor lamination stack. Significantly, the vibration common to prior art is eliminated. The absence of excess vibrational movement on this portion of the pawl brake assembly results in quiet operation of the motor.

BRIEF DESCRIPTION OF THE DRAWING

For a better understanding of the present invention, together with other objects, features and advantages, reference should be made to the following description of the preferred embodiment which should be read in conjunction with the following figures wherein like numerals represent like parts.

DETAILED DESCRIPTION OF THE INVENTION

In an exemplary embodiment, the present invention is useful in connection with an AC C-frame motor whose design possesses components required for operation via electromagnetic principles well known to those skilled in the art. It should be noted that because the present invention operates via electromagnetic principles, it may be adapted for use in all electric motors and solenoid devices.

Figure 1:
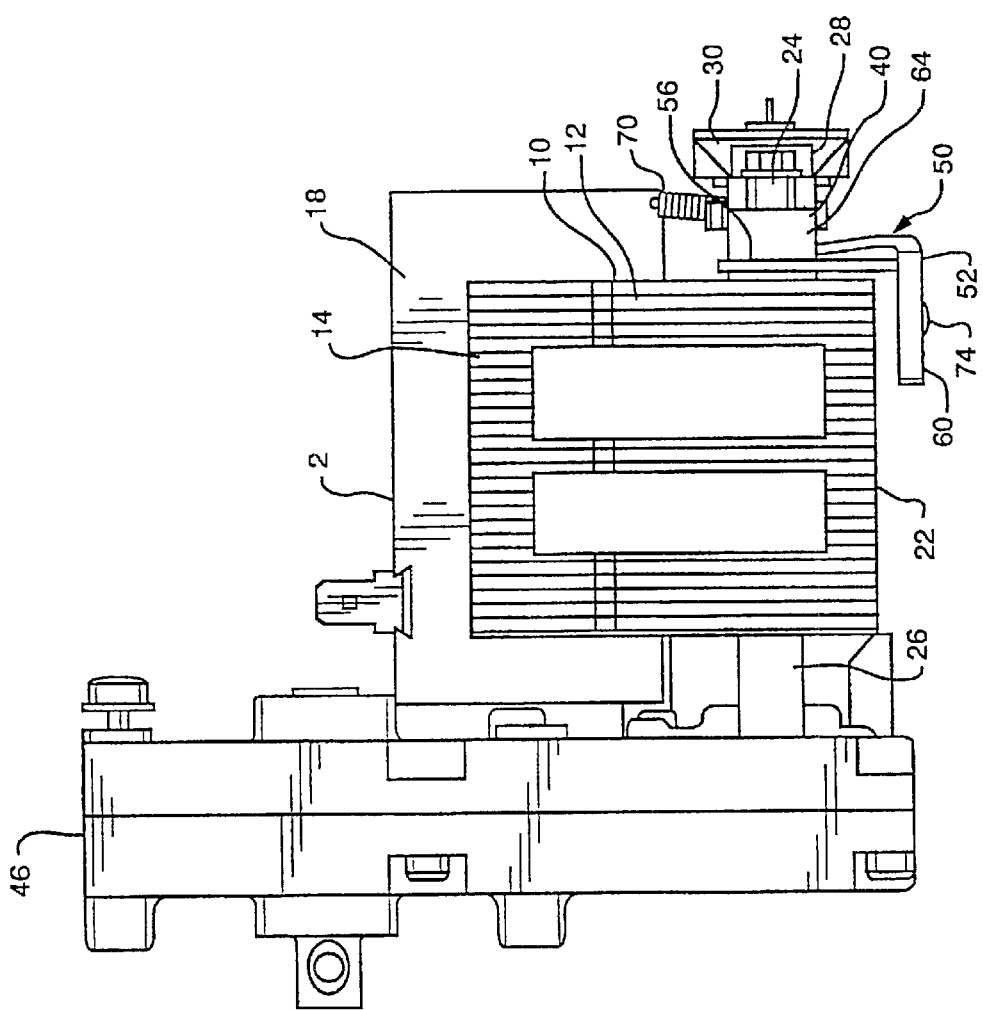
FIG. 1: is a side view of an exemplary motor wherein the motor is de-energized and a prior art pawl brake assembly is engaged.
Figure 2:
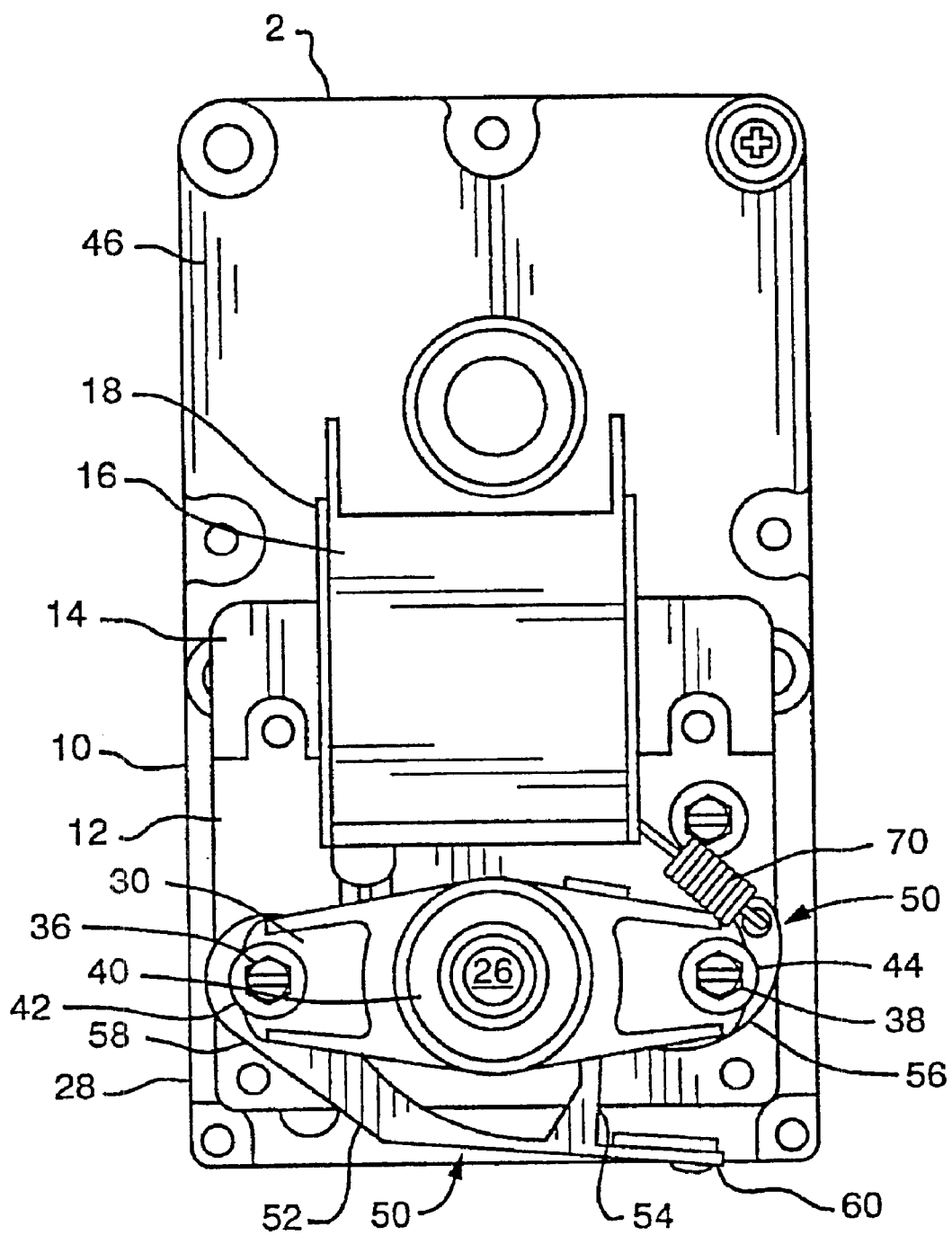
FIG. 2: is a front view of the motor shown in FIG. 1.
Figure 3:
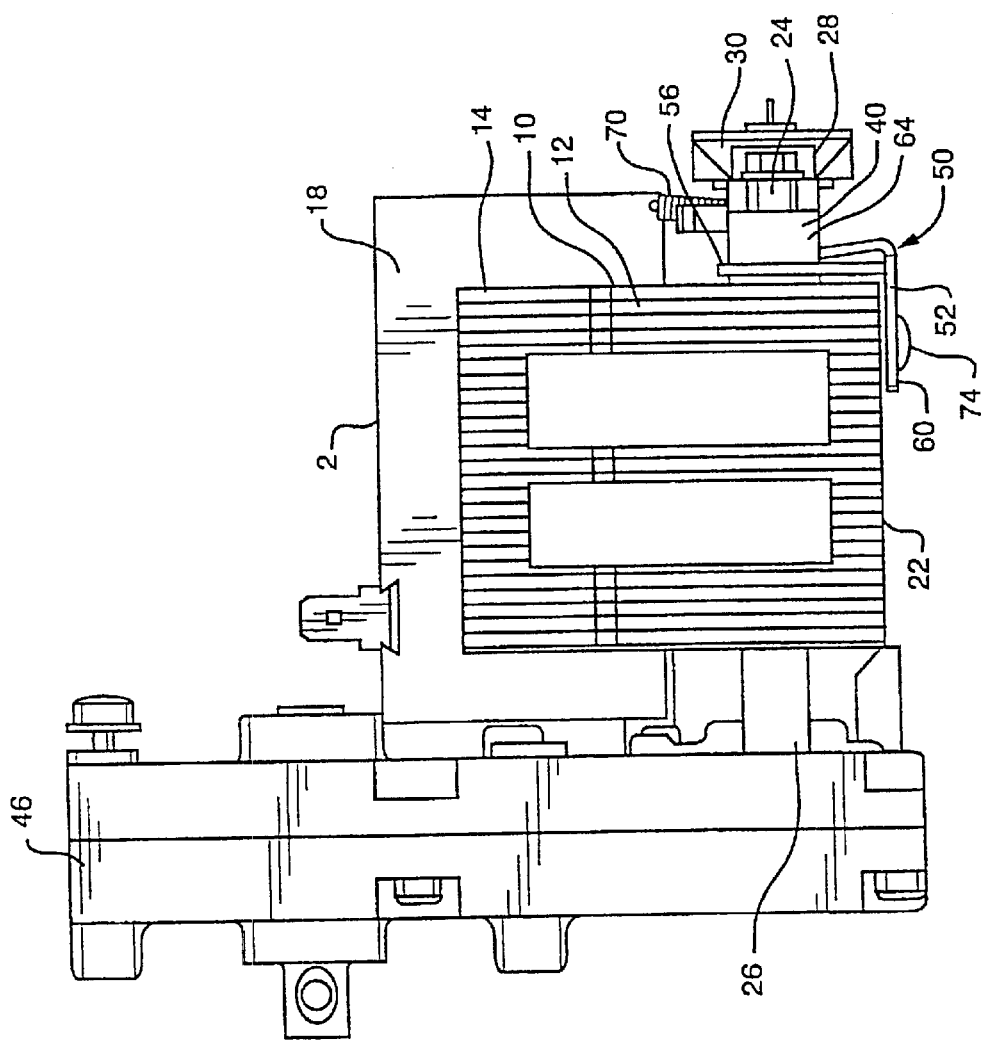
FIG. 3: is a side view of an exemplary motor wherein the motor is energized and a prior art pawl brake assembly is disengaged.
Figure 4:
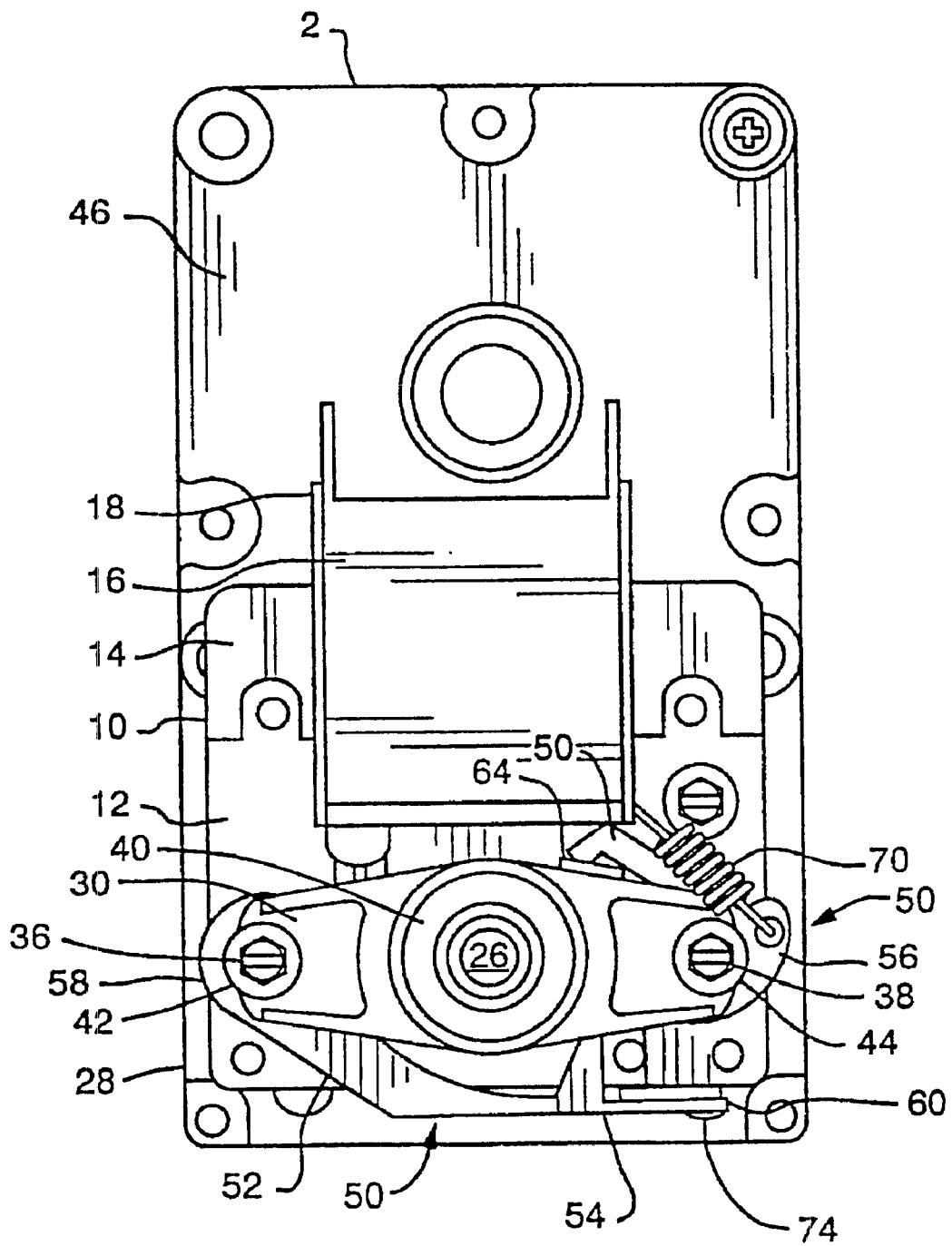
FIG. 4: is a front view of the motor shown in FIG. 3.

FIGS. 1 and 2 illustrate an exemplary embodiment of a prior art design wherein the AC C-frame motor is de-energized (i.e. no electric input to the motor) and the pawl brake assembly is in the braking position. FIGS. 3 and 4 illustrate an exemplary embodiment of a prior art design wherein the AC C-frame motor is energized (i.e. electric input to the motor) and the pawl brake assembly is not engaged. The main components of the illustrated AC C-frame motor assembly 2 are: a rotor assembly 40; and a stator assembly 10 having a C-frame portion 12, and I-bar portion 14, and a coil assembly 16. The C-frame portion 12 and the I-bar portion 14 may be made up of stacks of thin, steel laminations held together in intimate contact by welding, adhesive bonding, or rivets. The combined laminations of the C-frame portion and the I-Bar portion of the stator shall be referred to as the motor lamination stack 22. As is known, the size and power of the motor 2 maybe determined in part by the number of laminations included in the stator assembly 10. The coil assembly 16 may be made up of a plastic bobbin 18 with a specific number of turns of wire; i.e. a coil (not shown) wrapped around the bobbin 18. The size of the wire and the number of turns on the bobbin 18 are calculated to provide the desired performance characteristics of the motor 2.

The rotor assembly 40 may include a drive shaft 24, a two-pole permanent magnet 26, and a bearing 28. The magnet 26 is positioned circumferentially around the drive shaft 24, and the bearing 28 is disposed circumferentially around the end of the drive shaft 24 in a manner familiar to those skilled in the art. Finally, a bearing retainer 30 secures the rotor assembly 40 in position relative to the stator assembly 10 via two mounting posts 42 and 44. The bearing retainer 30 may have at least two posts 42, and 44 with bores formed therein which align with corresponding bores (not shown) formed through the stator assembly 10. At least two fasteners (i.e. bolts or screws) 36, and 38 pass through the at least two bores (not shown) in the bearing retainer 30, and the corresponding bores (not shown) in the stator assembly 10. The bearing retainer 30 thereby secures the rotor assembly 40 to the stator assembly 10 in a manner well known to those skilled in the art. In turn, the two posts 42, and 44 provide pivot points for the motion crucial to the operation of the pawl brake assembly of the present invention. The rotor drive shaft 24 may extend to a gearbox 46 for driving an output shaft through a gear train (not shown).

It is well known that the pawl brake assembly 50 may be mounted underneath the bearing 28 of the rotor assembly 40 in such an orientation so as to permit the pawl brake assembly 50 unimpeded cooperative contact with the rotor assembly 40 when the motor 2 is de-energized. Such cooperative contact between the pawl brake assembly 50 and the rotor assembly 40 facilitates the braking function of the pawl brake assembly 50.

As illustrated in FIGS. 1–4, the pawl brake assembly 50 consists of a pawl arm 52 with an extending trigger portion 54 and a brake portion 56 in cooperative contact with the extending trigger portion 54. A first end 58 of the pawl arm 52 is pivotally disposed around a first post 42 of the bearing retainer 30. A second end 60 of the pawl arm 52 is disposed adjacent to the motor lamination stack 22 for removing the brake portion 56 of the pawl arm assembly 50 from frictional contact with the rotor assembly 40 upon energization of the motor 2. The pawl arm 52 may be composed of any metal that would be subject to the influence of a magnetic field.

The extending trigger portion 54 of the pawl arm 52 is adapted to interact with the brake portion 56 of the pawl brake assembly 50 via a pivotal groove in the brake portion (not shown). The brake portion 56 of the pawl brake assembly 50 may be composed of a variety of materials, e.g. plastic.

As can be seen in FIGS. 1–4, the brake portion 56 of the pawl brake assembly 50 as well as the spring 70 in which it is in cooperative contact, are positioned to pivotally engage a second post 44 of the bearing retainer 30. The steel spring 70 is cooperatively engaged with the brake portion 56 of the pawl brake assembly 50 in a manner readily apparent to those skilled in the art, to bias the head 64 of the brake portion 56 into frictional engagement with the rotor assembly 40.

As is well known, when electric current creates a magnetic field in the stator assembly 10, the second end 60 of the pawl arm 52 is attracted to the stator assembly 10, as shown in FIGS. 3 and 4. As a result, the distal end (not shown) of the extending trigger portion 54 of the pawl arm 52 forces the head 64 of the brake portion 56 of the pawl brake assembly 50 out of engagement with the rotor assembly 40 against the bias of the spring force. Conversely, when the motor 2 is de-energized, as shown in FIGS. 1 and 2, the magnetic force in the stator assembly 10 is diminished, the second end 60 of the pawl arm 52 falls away from the motor lamination stack 22, and the spring force is sufficient to return the head 64 of the brake portion 56 of the pawl brake assembly 50 into frictional engagement with the rotor assembly 40.

Operation of the exemplary embodiment of the prior art has been problematic. To maintain free and smooth operation of the motor 2, the pawl arm 52 is mounted with considerable shaft clearance. Consequently it vibrates and is noisy during the motor operation. Additionally, this vibration of the pawl arm 52 may cause metal fatigue and eventual malfunction. In the prior art, the problems of noise and metal fatigue have been ameliorated somewhat by affixing a rubber bumper 74 onto the surface of the second end 60 of the pawl arm 52 in order to cushion the interaction between the pawl arm 52 and the motor lamination stack 22. The prior art has also attempted to solve this problem by reducing the shaft clearance. However, it has been found that if the clearances are reduced, malfunction of the motor may occur.

Figure 5:
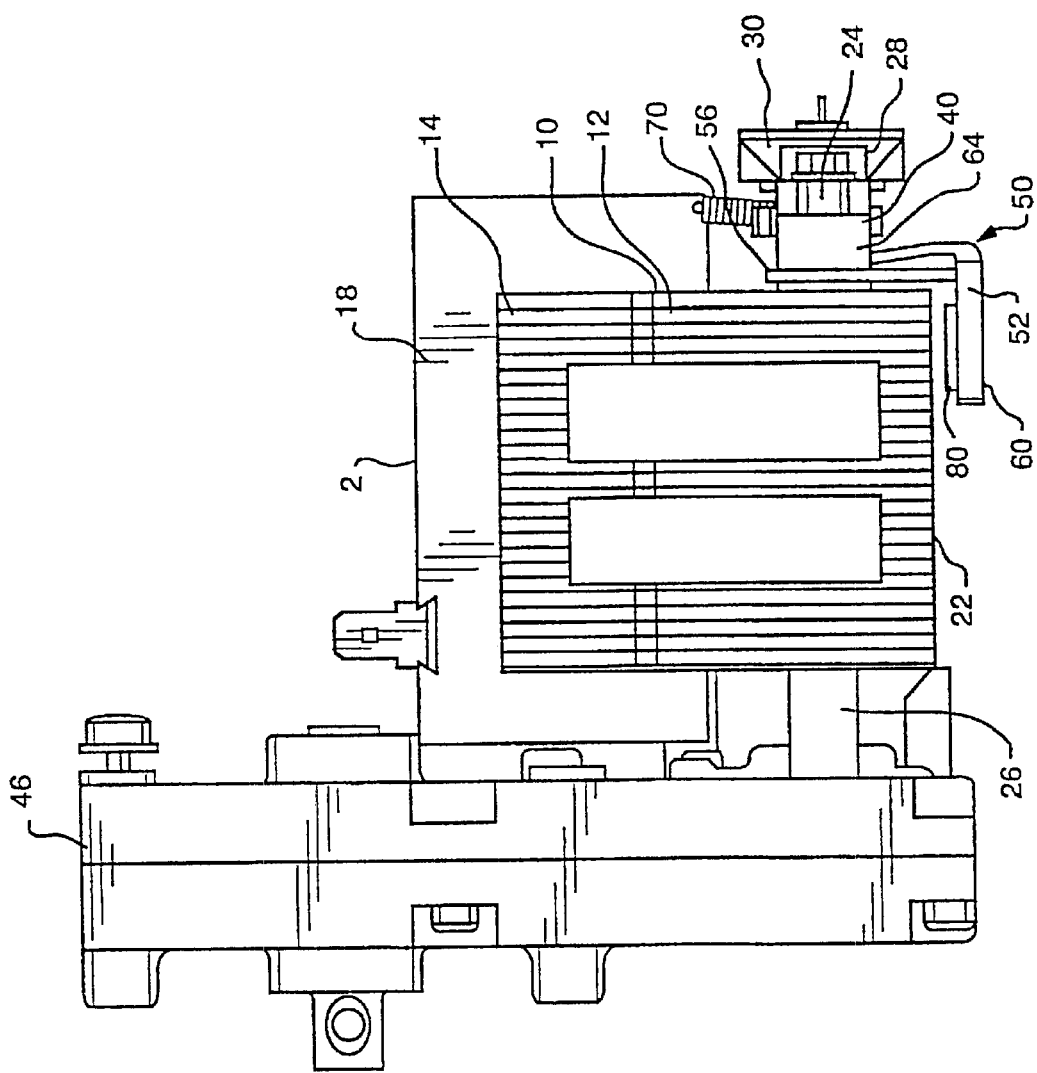
FIG. 5: is a side view of a motor assembly including an exemplary embodiment of the present invention wherein the motor is de-energized and the pawl brake assembly is engaged.
Figure 6:
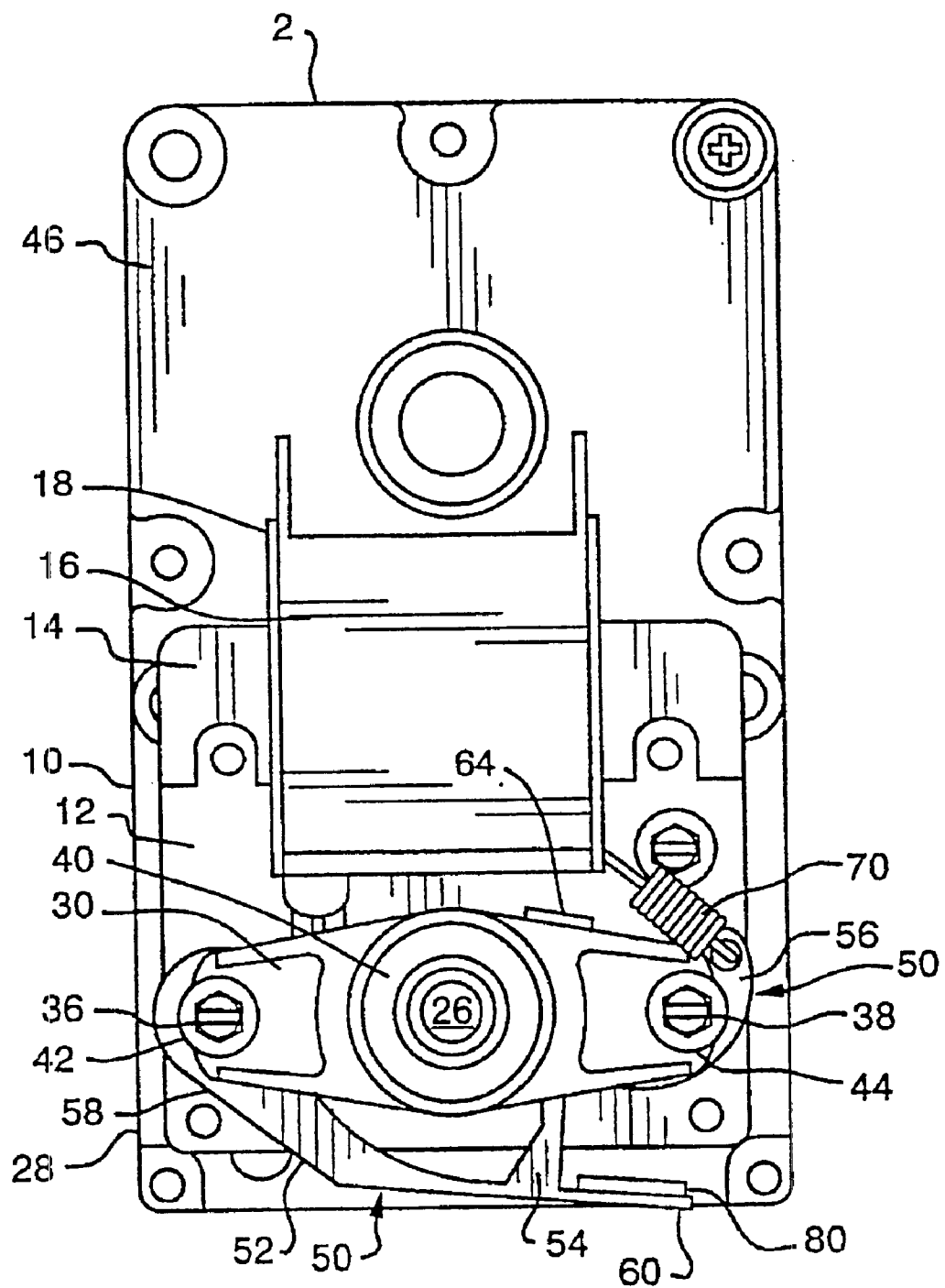
FIG. 6: is a front view of the motor assembly of FIG. 5.
Figure 7:
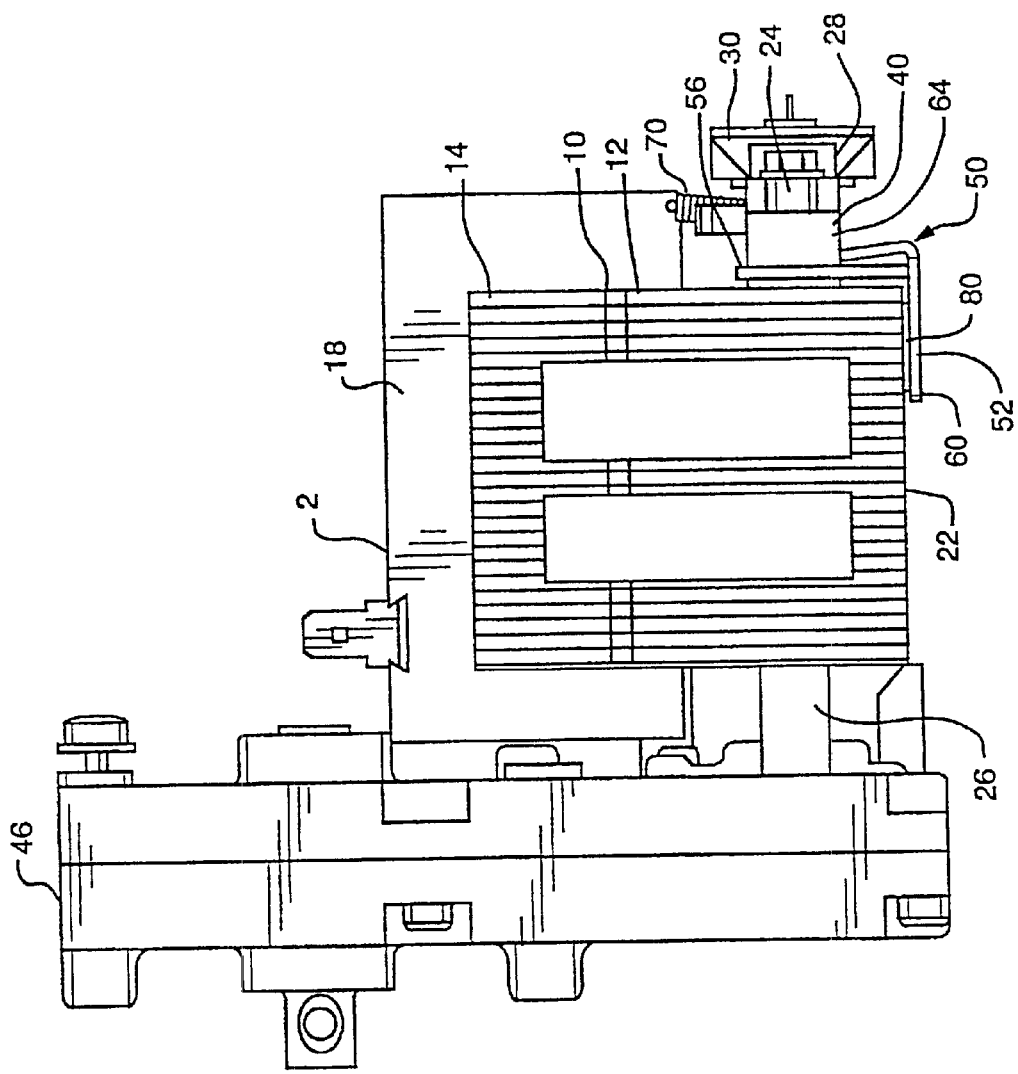
FIG. 7: is a side view of a motor assembly including an exemplary embodiment of the present invention wherein the motor assembly is energized and the pawl brake assembly is disengaged.
Figure 8:
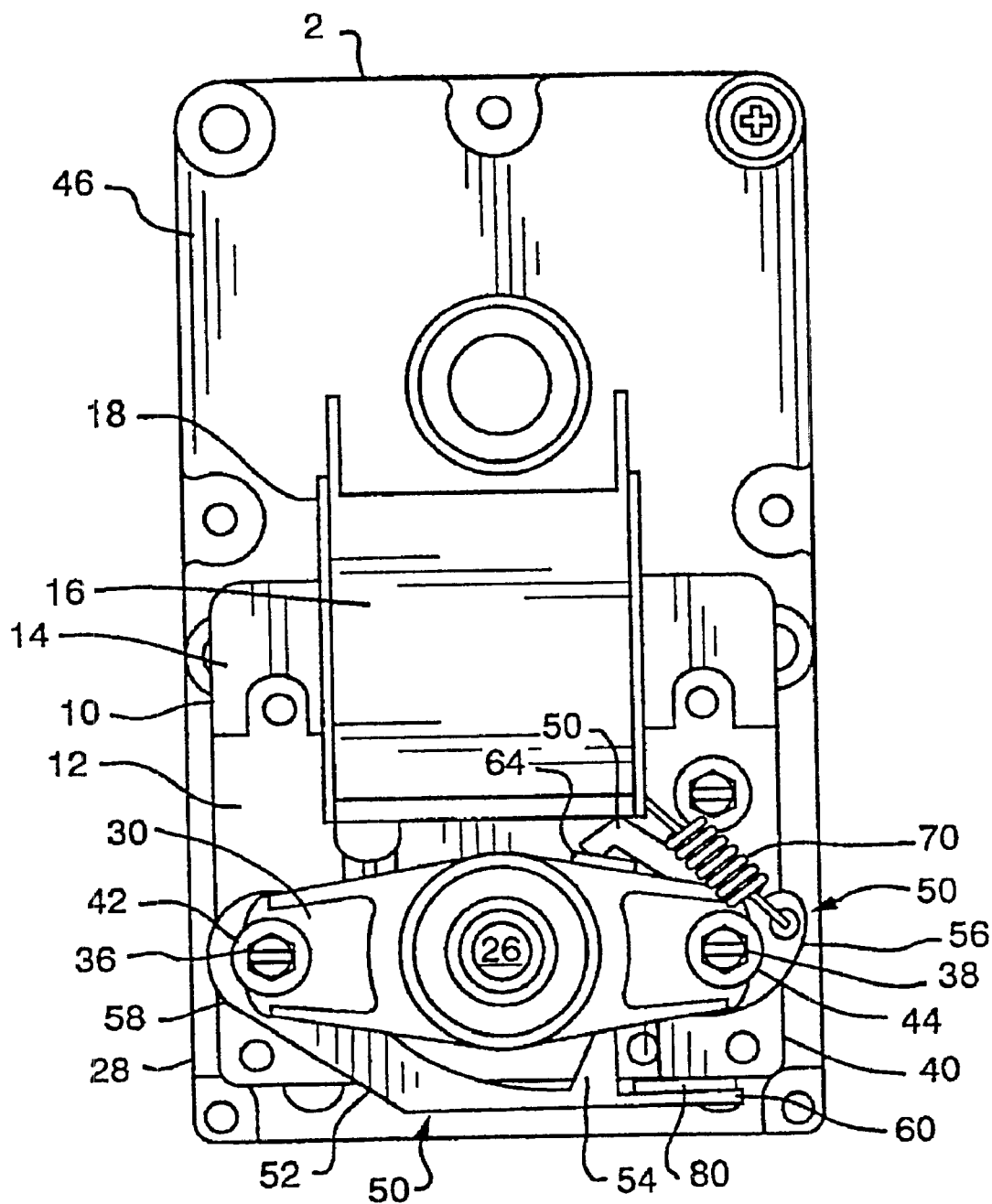
FIG. 8: is a front view of the motor assembly of FIG. 7.

FIGS. 5–8 illustrate an exemplary embodiment of the present invention that addresses the identified problems. FIGS. 5 and 6 illustrate an exemplary embodiment of the present invention wherein the AC C-frame motor 2 is de-energized (i.e. no electric input to the motor) and the pawl brake assembly 50 is engaged. FIGS. 7 and 8 illustrate an exemplary embodiment of the present wherein the AC C-frame motor 2 is energized (i.e. electric input to the motor) and the pawl brake assembly 50 is not engaged. In the present invention, a permanent magnet 80 is disposed upon the surface of the second end 60 of the pawl arm 52, replacing the inefficient bumper 74. The magnet 80 may be a magnetic strip or may be configured in any appropriate size and shape that will not interfere with the necessary spatial clearance between the pawl arm 52 and the motor lamination stack 22. The magnet 80 may be secured to the pawl arm 52 in a variety of ways, e.g. by an adhesive. When the motor 2 is energized, the magnet 80 is attracted to the motor lamination stack 22 with just enough magnetic force to hold and stabilize the second end of the pawl arm 60 against the motor lamination stack 22. Advantageously, the vibration of the second end 60 of the pawl arm 52 and the noise associated therewith are eliminated. When the motor 2 is de-energized, the pawl arm 52 moves away from the motor lamination stack 22, and the head of the brake portion 64 engages the rotor assembly 40 under the force of the spring 70.

The novel use of a magnet 80 in cooperation with a pawl brake assembly 50 provides a simple, elegant, and inexpensive solution to the identified noise and metal fatigue problems. Employing electromagnetic principles to improve the operation of all electric motors by including a permanent magnet on a pawl brake assembly has the additional advantage of solving the identified problems without having to significantly re-fashion the physical design of the motors.

The embodiments which have been described herein, however, are but some of the several which utilize this invention and are set forth here by way of illustration but not of limitation. For example, the novel use of a magnetic strip to stabilize a pawl arm during the energizing of a motor would apply to all solenoid devices. It is obvious that many other embodiments, which will be readily apparent to those skilled in the art, may be made without departing materially from the spirit and scope of this invention. Accordingly, the foregoing description is by way of example only, and is not intended to be limiting. The invention is limited only as defined in the following claims and the equivalents thereto.

What is claimed is:

1. A pawl brake assembly for braking the rotation of a rotor assembly of an AC C-frame electric motor comprising:
   a brake portion having a head normally biased into frictional engagement with the rotor assembly to limit the rotation of the rotor assembly;
   a pawl arm disposed adjacent the rotor assembly for coacting with said brake portion to move the brake portion between a braking position and a release position; and
   a permanent magnet secured to said pawl arm wherein upon energization of said AC C-frame electric motor, the magnet secured to the pawl arm is attracted toward an electric motor for moving the head to the release position and removing said head from frictional engagement with said rotor assembly, wherein the magnet is attracted into contact with the AC C-frame electric motor to hold the pawl arm in contact with the electric motor to resist vibration of said pawl arm.

2. The pawl brake assembly of claim 1, wherein said AC C-frame electric motor includes a stator assembly, the rotor assembly, and a bearing retainer, said bearing retainer thereby securing said rotor assembly to said stator assembly.

3. The pawl brake assembly of claim 1, wherein said pawl brake assembly is in cooperative contact with said rotor assembly for facilitating the braking function of said pawl brake assembly.

4. The pawl brake assembly of claim 1, wherein said pawl arm comprises a first end, a second end, and an extending trigger portion radially disposed between said first end and said second end of said pawl arm.

5. The pawl brake assembly of claim 4, wherein said extending trigger portion is adapted to interact with said brake portion of said pawl brake assembly via a pivotal groove in said brake portion.

6. The pawl brake assembly of claim 1, wherein said pawl arm has a composition comprising of any metal alloy which would be subject to the influence of a magnetic field.

7. The pawl brake assembly of claim 1, wherein said magnet is disposed upon the surface of said second end of said pawl arm, wherein upon energization of said AC C-frame electric motor, said magnet is attracted to said stator assembly of said AC C-frame electric motor with sufficient magnetic force to disengage said head of said brake portion from said rotor assembly, and said second end of said pawl arm is attracted to said stator assembly with sufficient magnetic force to hold the second end in contact with the stator assembly to reduce the vibration and the noise, and wherein upon de-energization of said AC C-frame electric motor, the magnetic force between said magnet and said stator assembly is diminished such that said second end of said pawl arm falls away from said stator assembly, and said head of said brake portion is biased into frictional engagement with said rotor assembly.

8. A method for reducing the vibration and noise associated with a pawl brake assembly used for braking a rotor assembly of an AC C-frame electric motor, said method comprising:
   providing a pawl brake assembly comprising a brake portion and a pawl arm, said pawl arm having a first end, a second end, and an extending trigger portion radially disposed between said first end and said second end of said pawl arm;
   adapting said extending trigger portion of said pawl arm to interact with said brake portion of said pawl brake assembly via a pivotal groove;
   having said brake portion in cooperative contact with a spring to bias a head of said brake portion into frictional engagement with said rotor assembly, thereby causing said brake portion to brake said rotor assembly upon de-energization of said AC C-frame electric motor;
   having said pawl arm composed of any metal alloy subject to the influence of a magnetic field; and
   disposing a permanent magnet upon the surface of the pawl arm of said pawl brake assembly, wherein upon energization of said AC C-frame electric motor, said pawl arm is attracted toward a magnetic field generated by a stator assembly of said AC C-frame electric motor thereby removing said head from frictional engagement with said rotor assembly of said AC C-frame electric motor and holding the pawl arm in contact with the electric motor to reduce vibration of said pawl arm.

9. A pawl brake assembly for use with an electric motor having a rotor assembly and a stator assembly, the pawl brake assembly being operable to limit the rotation of the rotor assembly of the electric motor, the pawl brake assembly comprising:
   a pawl arm pivotally mounted to the electric motor and movable toward and away from contact with the stator assembly;
   a brake portion formed on the pawl arm and having a head normally biased into engagement with the rotor assembly to limit rotation of the rotor assembly when the electric motor is de-energized; and
   a permanent magnet secured to the pawl arm and positioned adjacent to the stator assembly, wherein upon energization of the electric motor, the magnet secured to the pawl arm is attracted into contact with the stator assembly by the magnetic field generated by the stator assembly, wherein the magnetic holds the pawl arm in contact with the stator assembly to reduce vibration of the pawl arm relative to the stator assembly when the electric motor is energized.

10. The pawl brake assembly of claim 9 further comprising a spring coupled to the brake portion to bias the brake portion into engagement with the rotor assembly when the electric motor is de-energized.

* * * * *